(12) United States Patent
Markow et al.

(10) Patent No.: US 6,359,994 B1
(45) Date of Patent: *Mar. 19, 2002

(54) PORTABLE COMPUTER EXPANSION BASE WITH ENHANCEMENT SPEAKER

(75) Inventors: Mitchell A. Markow, Spring; Ji-An Gong, Houston, both of TX (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,054

(22) Filed: May 28, 1998

(51) Int. Cl.[7] .......................... H04R 1/02; H04R 9/06; G06F 1/16

(52) U.S. Cl. ..................... 381/333; 381/388; 381/99; 361/683

(58) Field of Search ................ 381/300, 301, 381/306, 87, 332, 333, 335, 150, 349, 350, 352, 386, 387, 388, FOR 125, FOR 165, FOR 139; 248/917, 918; 361/681, 682, 683

(56) References Cited

U.S. PATENT DOCUMENTS

| | | | | |
|---|---|---|---|---|
| 5,027,403 A | * | 6/1991 | Short et al. | 381/306 |
| 5,157,585 A | | 10/1992 | Meyers | 361/380 |
| 5,197,100 A | * | 3/1993 | Shiraki | 381/306 |
| 5,488,572 A | * | 1/1996 | Belmont | 361/683 |
| 5,557,562 A | * | 9/1996 | Yoshiharu et al. | 361/747 |
| 5,604,663 A | * | 2/1997 | Shin et al. | 361/686 |
| 5,668,882 A | * | 9/1997 | Hickman et al. | 381/300 |
| 5,701,347 A | * | 12/1997 | Daniels et al. | 381/300 |
| 5,729,430 A | * | 3/1998 | Johnson | 381/336 |
| 5,838,537 A | * | 11/1998 | Lundgren et al. | 361/683 |
| 5,847,922 A | * | 12/1998 | Smith et al. | 381/388 |
| 5,898,137 A | * | 4/1999 | Saito | 381/300 |
| 5,915,100 A | * | 6/1999 | Crump et al. | 395/281 |
| 5,970,161 A | * | 10/1999 | Takashima et al. | 381/388 |
| 6,007,228 A | * | 12/1999 | Agarwal et al. | 361/683 |
| 6,040,978 A | * | 3/2000 | Spencer | 381/300 |
| 6,175,489 B1 | * | 1/2001 | Markow et al. | 381/300 |

FOREIGN PATENT DOCUMENTS

JP 7-036577 * 2/1995 ................ 361/683

OTHER PUBLICATIONS

Dimitriadis et al., "Piezoelectric Actuators for Distributed Vibration Excitation of Thin Plates," Journal of Vibration and Acoustics, Jan. 1991, vol. 113, pp. 100–107.

Sonti et al., "Equivalent Forces and Wavenumber Spectra of Shaped Piezoelectric Actuators," Journal of Sound and Vibration, 1995, 187, pp. 111–130.

"Quickpack Piezoelectric Actuators", ACX(Active Control eXperts) Nov. 1996, 12 pages.

* cited by examiner

*Primary Examiner*—Xu Mei
(74) *Attorney, Agent, or Firm*—Conley, Rose & Tayon, P.C.

(57) ABSTRACT

An expansion base with a rearward-emitting expansion speaker for emitting low frequency audio and providing surround sound capability. The frequency response of the expansion speaker includes subwoofer frequencies, and is also extended to 600 Hz or higher, to enhance surround sound and spatial impression effects.

28 Claims, 7 Drawing Sheets

PORTABLE COMPUTER EXPANSION BASE WITH ENHANCEMENT SPEAKER

BACKGROUND AND SUMMARY OF THE INVENTION

This application is related to audio speaker systems in portable computers.

Background: Computer-Based Audio

The production of quality sound with computers has advanced significantly in recent years. Early personal computers typically had nothing more than a single, small speaker used to produce a beep or series of single-frequency beeps to indicate system status upon startup. However, consumers demanded more. With the significant advances in circuit miniaturization, improved sound quality electronics has been available for desktop systems for some time, and is now moving into the portable computer systems arena.

Today, there is a multimedia explosion that is adding a significant new dimension to the way people use computers. One of the biggest advantages is 16-bit, CD-quality sound. With the right speakers, this sound can be as impressive as the sound on a normal consumer's stereo system. More and more, computer applications include the capability to use and capture the full impact of 16-bit sound for multimedia. MIDI musical compositions become more inspiring, games more suspenseful, software more dramatic, and radio and television programs (obtained through the computer) can equal the quality of conventional reception systems.

In addition, computer and audio technologies are revolutionizing business. For example, in video conferencing, voices are reproduced with a natural quality that makes them seem as if the speaker were in the room. Providing a high-quality audio background during presentations greatly enhances their effectiveness, and portable computers provide the greatest opportunity for meeting this need. Furthermore, the work environment is becoming ever more mobile with employees traveling more, and perhaps even telecommuting (working from home). Use of increased travel time translates to work environments with higher ambient noise, such as airports, trains, or mass transit systems. Another factor in this trend is the user's need for more effective methods for communicating with potential customers, or even with the office when away on business.

Background: Spatial Impression

The design of sound reproduction systems is not only based on considerations of electrical and acoustical engineering and physics, but also requires knowledge of psychoacoustics, i.e. how sound is perceived by listeners.

One of the parameters of psychoacoustics is spatial impression. When a sound is generated in a room, the listener will first hear the sound via the direct path from the source. Shortly thereafter, the listener will hear the reflections of the sound off surfaces such as walls or ceilings. Human listeners will assess the size of the space they are in by listening to laterally reflected sound which accompanies a sound signal. Thus, in a loudspeaker system it is desirable to have some sound transmission paths which reach the ears of the listener with a certain amount of delay (e.g. 10–60 milliseconds) as compared with the direct transmission path. (This will give the impression of a spacious listening room by broadening the soundstage, and also by giving the illusion of pushing the sound beyond the physical location of the speakers, even if the listener is listening in a room which is very small.) Moreover, another peculiarity of this psychoacoustic parameter is that the low frequencies (below 500 Hz) dominate spatial impression. A more roomy spatial impression is welcome to many listeners. However, it is not easy to do this with a small speaker system, and particularly not with a small portable computer's speaker system.

To increase spatial impression, the ratio of laterally reflected energy to directly transmitted energy can be increased: the higher this ratio, the greater the spatial impression. (An extreme case of this is found in a symphony concert hall, where there is almost no direct sound.)

Whether the user is video-conferencing, playing a game, or just working with music in the background, spatial impression plays an important role in the computing experience. That role is growing ever more important as multimedia makes its way into even the most uncompromising of business applications.

Further background regarding spatial impression can be found in: J. Blauert, SPATIAL HEARING (2.ed. 1996); and in M. Barron, "Effects of Early Reflections on Subjective Acoustic Quality in Concert Halls" (thesis, University of Southampton, 1974); both of which are hereby incorporated by reference.

Background: Stereophonic and Surround Sound

Since its introduction in the 1950's, stereo has been regarded as an essential minimum requirement of quality sound reproduction. Stereo can convey a traditional soundstage in which the sound comes from the front, such as when one attends a play or concert. However, even stereo has shortcomings when required to convey the ambiance where the sound is heard from all around the listener. Stereo's lack of spatiality undermines sonic realism in, for example, a game where aircraft fly overhead from front to back, or footsteps come from off to the side. For this reason various "surround sound" schemes have been used, to provide at least some speaker output behind the listeners' positions.

Background: Portable Computer Audio Limitations

Two driving constraints on the development of portable computers are volume and power consumption. The form factor of portable computers cannot be expanded, so that volume is a key resource. Additional functions are continually sought to be added, and many of these place new demands on available volume. Moreover, as larger display sizes become available they require more area in the lid, and hence consume more volume. Similarly, users continually demand more battery lifetime, which implies a continuous struggle to minimize power consumption.

These two constraints bind especially tightly in the case of speakers: the low-frequency power-efficiency of a speaker is directly affected by its volume. Since low-frequency response is a significant limitation of portable speaker systems, this is a difficult constraint. Some attempts have been made to use external speakers with portable computers, but this is cumbersome.

As of 1997, the internal sound systems typically sold with portable computers produce marginal sound quality at best. Most multimedia computers sold today include a stereo sound card which is capable of reasonably good sound reproduction. However, the internal speakers are typically small and produce tinny sound with inadequate bass. As a result, millions of multimedia computer users suffer very poor sound fidelity from their computers.

However, poor sound quality in portable computers is undesirable. The experience of a game or multimedia presentation, with sound and video animation, can be astonishingly real when coupled with quality audio. Quality sound can make a significant difference in the enjoyment the user can get from a multimedia computer. Music while working is more enjoyable, training and "edutainment" titles are richer, and games become much more realistic and exciting.

Background: Subwoofers

One of the challenges in high-fidelity audio reproduction is low-frequency reproduction. The extreme lower limit of human hearing is around 20 Hz (about an octave below the bottom note on a bass guitar) for very loud sounds. However, human hearing becomes less sensitive at low frequencies, so the threshold of audibility for such low sounds is relatively high. While recorded music seldom uses frequencies below 30 Hz, frequencies down to about 30 Hz do appear in orchestral recordings. Moreover, frequencies down to 30 Hz or even below may be used for special effects. This is a problem, because the acoustic impedance of many conventional speaker configurations becomes very small below 50 Hz or so, and this means that such speaker systems are inefficient at turning electrical signals into sound waves.

One conventional audio engineering technique for enhancing low-frequency reproduction is subwoofers. A conventional subwoofer is an additional speaker which is designed to produce deep bass (and only bass). Thus the design specifications for a subwoofer typically cover only a limited range of frequencies (typically 3 octaves or less), so the subwoofer can be optimized for efficiency and power-handling in this range. Low-pass filtering is typically used to prevent the subwoofer from exposure to midrange signals, so midrange distortion (which can be caused e.g. by cone breakup with large cone diameters) is not a concern. Thus subwoofers in component systems commonly use large cone diameters, such as 12 inches or more. The cabinets of conventional subwoofers are often designed with tuned-port resonances which will optimize efficiency at low frequencies.

Typically only one subwoofer is used. The human ear is virtually unable to detect the origin of sufficiently deep bass sounds, so having two subwoofers is of no benefit from the standpoint of stereo separation. (For example, a bass guitar's low E has a wavelength of about 27 feet, and human ears are too close together for directional hearing at such wavelengths.) Therefore, it is not necessary to have the subwoofer in a line-of-sight or even pointing toward the listener's ears. When using a subwoofer with a pair of satellite speakers (producing a stereo effect), the listener's ears are fooled into "hearing" all of the sound, including the bass, coming from the satellites. In component systems, a good quality subwoofer operates in frequency down to 35 Hz or lower. Over 150 Hz, it will start interfering with the stereo effect of the satellite speakers.

Smaller "subwoofers" have also been used in volume-limited audio systems, such as automotive systems. Such "subwoofers" are not of the same dimensions as those in component systems, but still serve to extend the range of the total speaker system. For example, in a portable computer system which has small primary left and right speakers whose response rolls off below 300 Hz or so, a subwoofer in an expansion base would typically have an upper frequency of 500 Hz or so.

Portable Computer Expansion Base with Enhancement Speaker

The present application discloses the use of a portable computer expansion base with an added low-frequency-capable speaker which is not merely a subwoofer. The response of this added speaker not only provides subwoofer effects, but also is extended above the subwoofer range to provide other functions. Specifically, the response is extended high enough to provide directionality, and the direction of acoustic emission is primarily toward the rear of the unit, away from the listener. This rearward emission provides multiple benefits, at frequencies above the subwoofer range, which in various embodiments may include some or all of the following:

enhanced spatial impression;

greater total midrange power;

greater front-back depth of the acoustic image; and some enhanced surround-sound impression (depending on the room environment), due to acoustic reflections from the rear-firing speaker.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Portable Computer/Expansion Base Physical Layout

Figure 1A:
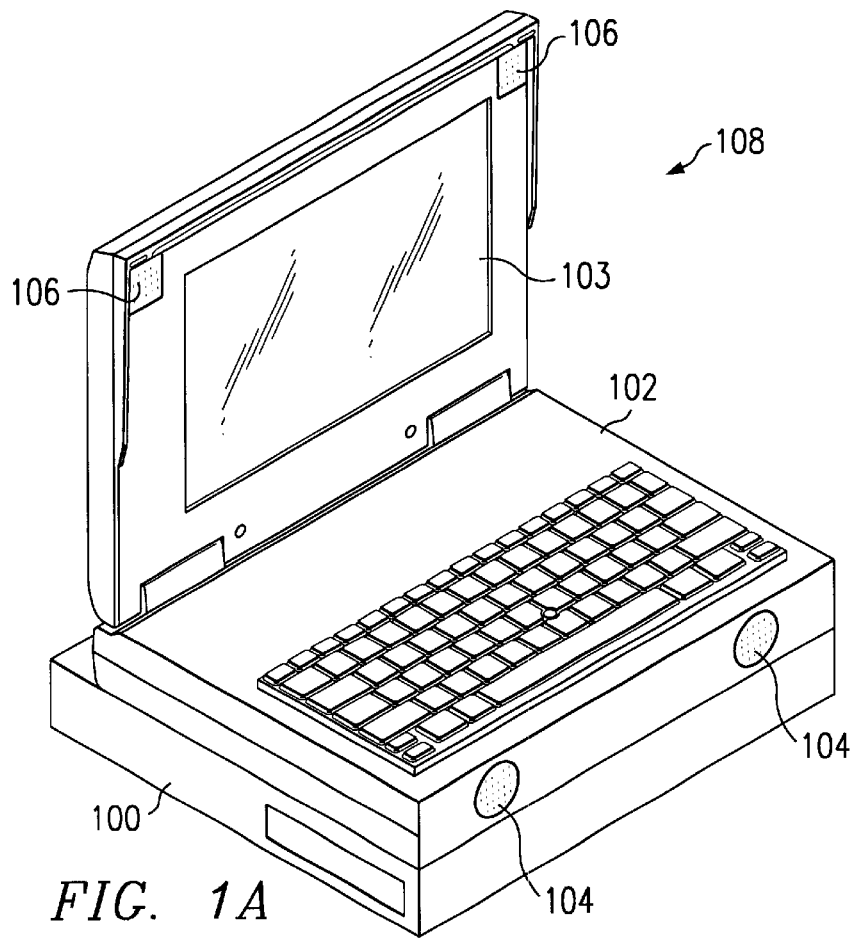
FIGS. 1A and 1B schematically show a sample embodiment of speaker placement in a portable computer which is docked in an expansion base with the enhancement speaker.
Figure 1B:
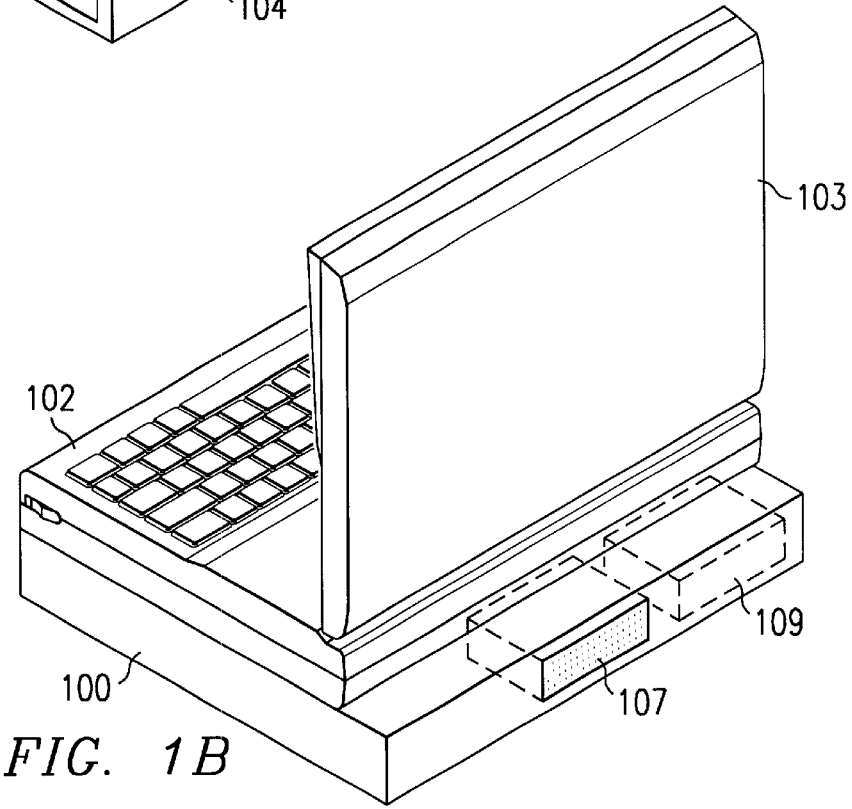

FIGS. 1A and 1B schematically show a sample embodiment of speaker placement in a portable computer which is docked in an expansion base with the enhancement speaker.

The expansion base 100 accepts a portable computer 108 with a display 103. The computer 108 may comprise a first set of forward-firing voiceband/high-frequency speakers 106 located in the display 103, and/or a second set of forward-firing speakers 104 located in the main body 102 of computer 108. A low-frequency-capable rear-firing enhancement speaker 107 may be located in the rear of the main body 102 of the computer 108. The enhancement speaker 107 emits acoustic energy through the gap beneath the computer, and a significant fraction of this energy will escape toward the rear. If acoustically reflective surfaces happen to be near the speaker system (as is likely), then this rear-directed emission can be reflected back to the listener's position. The low-frequency enhancement speaker 107 is positioned in the expansion base in such a way that acoustic energy from the speaker 107 is emitted in a downward direction toward the surface upon which the expansion base 100 is sitting. In the preferred embodiment, the expansion speaker has approximately 18 cubic inches of volume.

Optionally, the speaker 107 may be positioned anywhere (for example, at location 109) in the expansion base 100 to provide optimal low-frequency acoustical energy radiation.

Figure 1C:
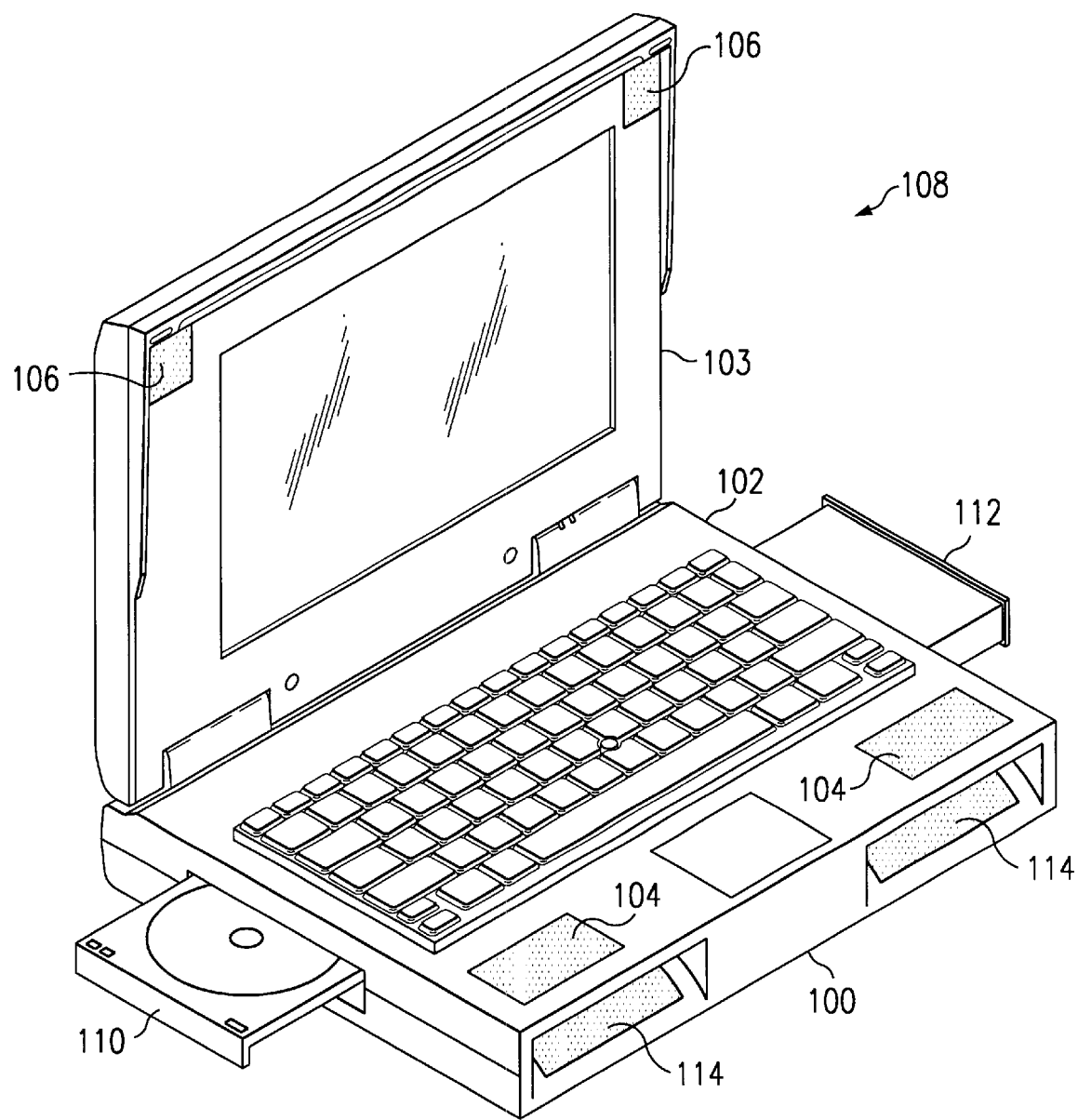
FIG. 1C shows a computer being docked to a thin enhancement base.

FIG. 1C shows the mechanical relations involved in docking a computer 108 to a thin enhancement base 100. In this embodiment, the thin enhancement base 100 may also comprise a CD-ROM drive 110 as an add-on peripheral. The enhancement base 100 may also comprise forward speakers 114 to enhance audio fidelity and spatial impression to the listener. The enhancement base 100 speakers 114 may be designed to work in concert with the portable computer speakers 104. The portable computer 108 may also comprise a removable hard drive 112 data portability and easy upgrading.

Figure 6A:
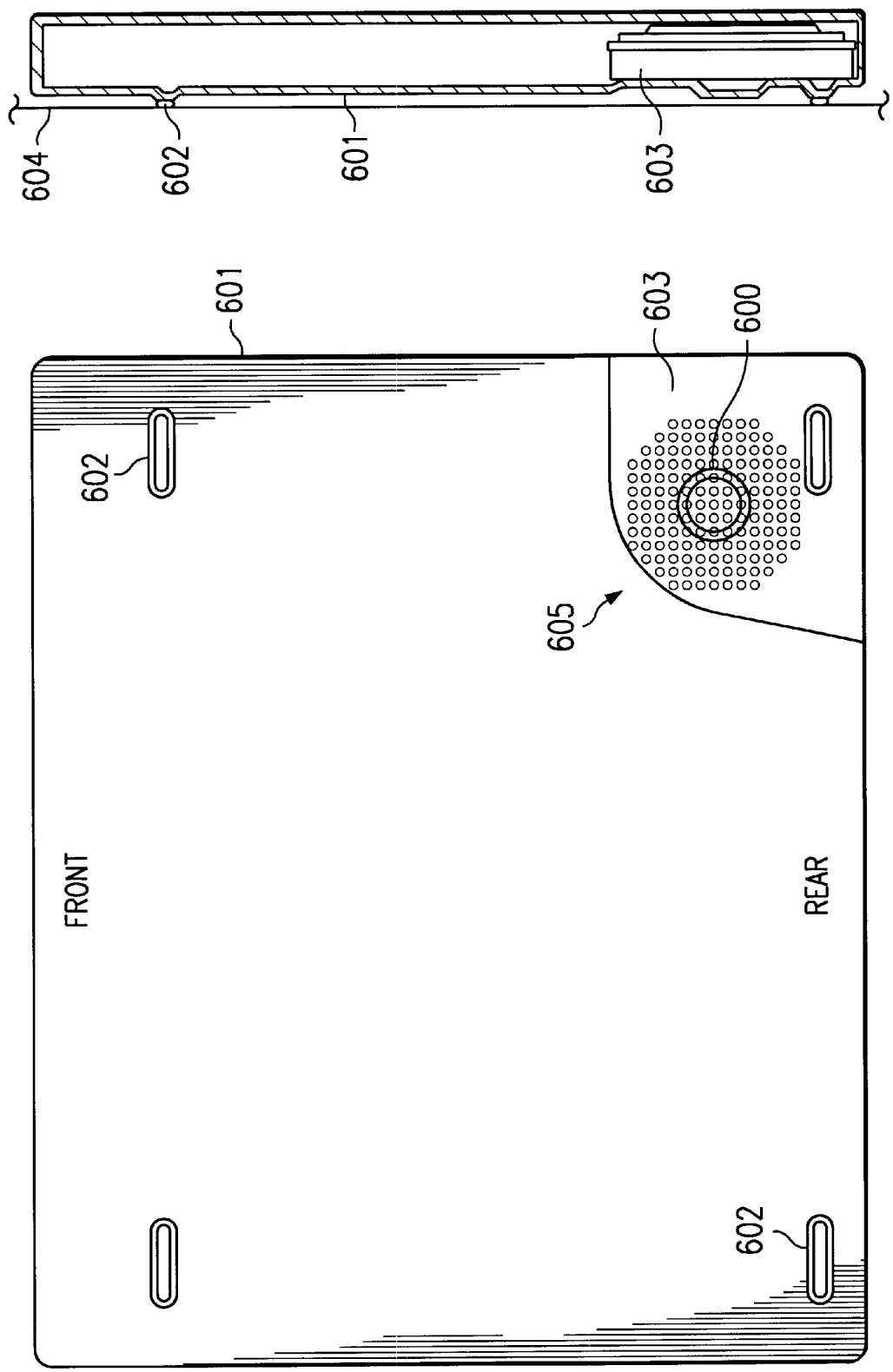
FIGS. 6A and 6B show preferred embodiments of an expansion base incorporating a low-frequency speaker.

FIG. 6A illustrates one implementation of the low-frequency-capable enhancement speaker in an expansion base. In this embodiment, and viewing from the bottom of the expansion base 601, the enhancement speaker 600 is positioned in a rear corner 605 of the expansion base 601. The cut-away portion of the base 601 provides an opening, exposing the speaker grill 603, to allow acoustical energy to pass freely from the base unit 601 to a reflecting surface 604 on which the computer sits. Expansion base pads 602 provide low-frequency vibration mitigation between the surface 604 and the expansion base 601 during, for example, high volume excursions. Optionally an open channel in the bottom surface of the base can be used to provide additional acoustic loading for low frequencies.

Figure 6B:
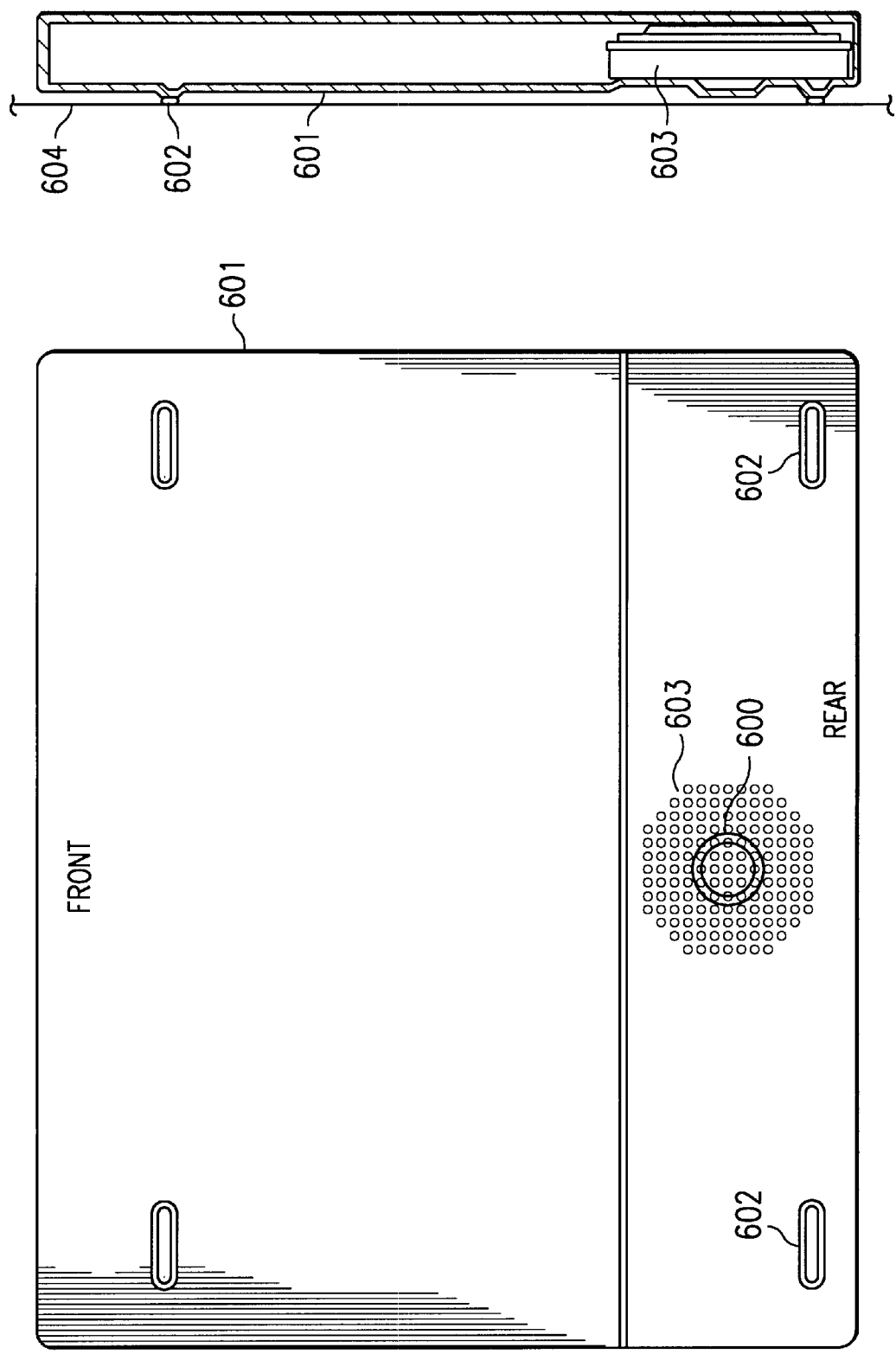

FIG. 6B illustrates an alternative embodiment where the enhancement speaker 600 is centered in the rear of the expansion base 601. The position of the speaker may be in a variety of locations based on a number of constraints, including design and sound quality.

Figure 2:
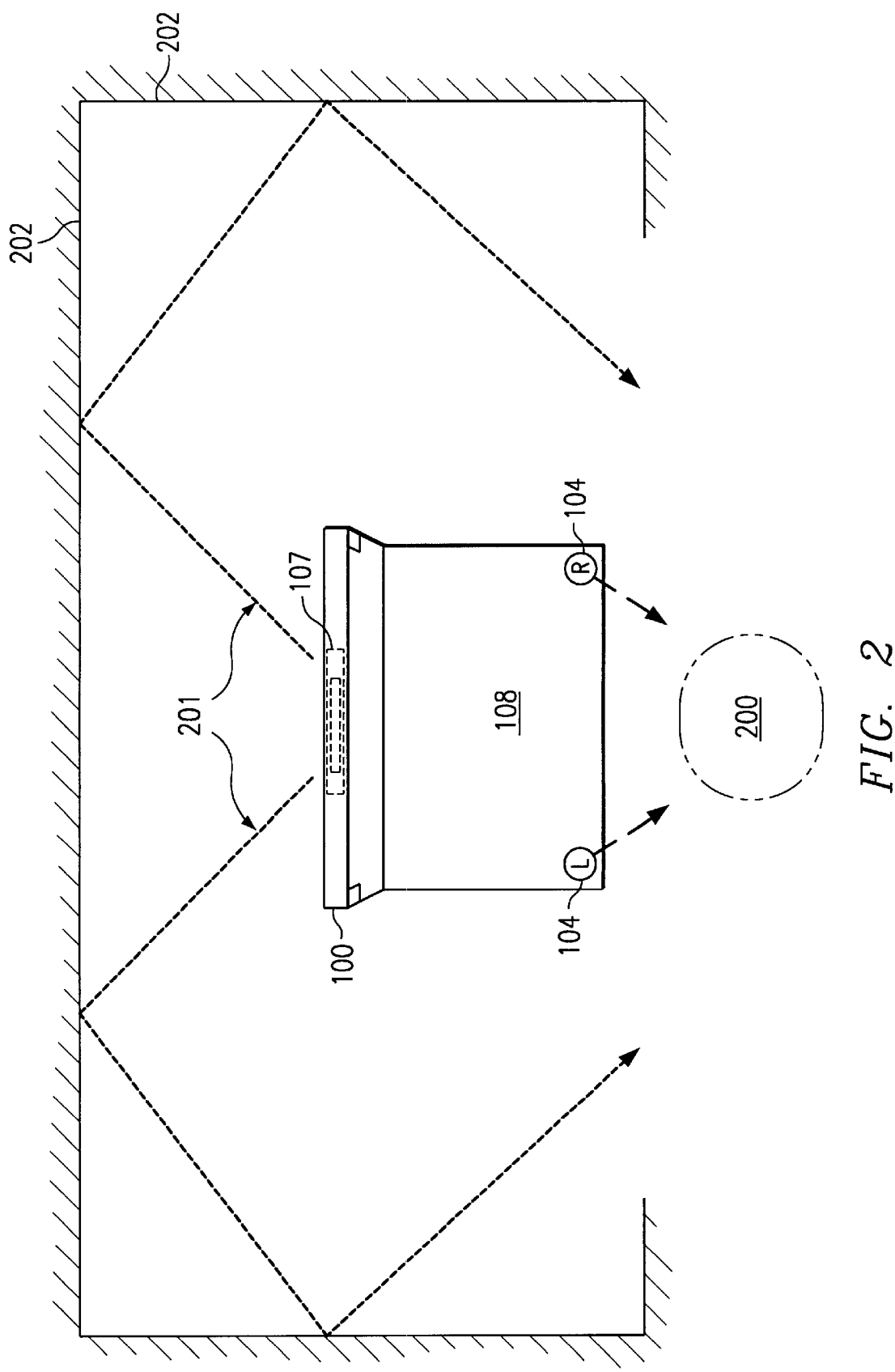
FIG. 2 shows a reflected sound wave path emitted from the expansion speaker of the docking station.

FIG. 2 shows a reflected sound wave path of sound emitted from the expansion speaker of the docking station. A listener 200 is seated in front of the computer 108 positioned in expansion base 100. Listener 200 senses sound waves 201 from the rear-firing low-frequency enhancement speaker 107 when the sounds are reflected off surfaces 202. Additionally, forward-firing speakers 104 provide the high-frequency audio component to the listener 200.

Audio Circuit

Figure 3:
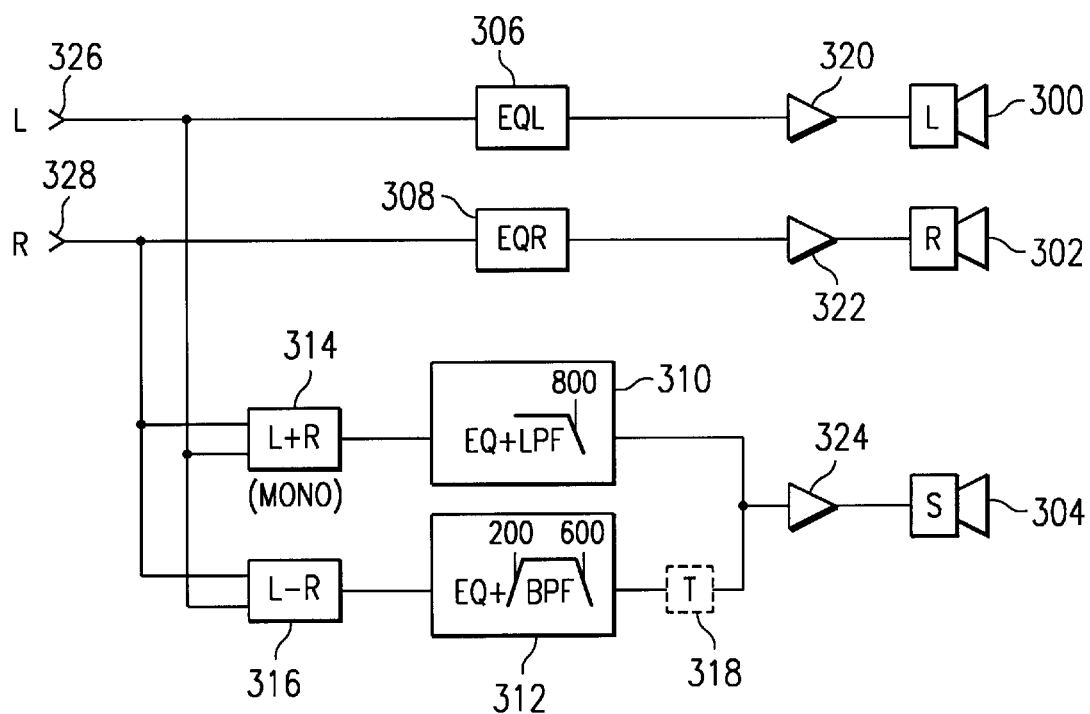
FIG. 3 shows a block diagram of the audio circuit of the preferred embodiment.

FIG. 3 shows a block diagram of the audio circuit of the preferred embodiment. Left channel input 326 receives an audio signal for processing to the left channel speaker 300. The signal is fed through a left channel equalizer 306 to amplifier 320 to drive speaker 300. The signal path discussion is similar for the right channel. With respect to the low-frequency channel, the audio signal left and right channel (mono) components are added in summer 314 before being filtered. A low-pass filter circuit 310 comprises a filter that passes low-frequency components (up to approximately 800 Hz) to the amplifier 324 for driving the expansion speaker 304. The low-pass filter circuit 310 preferably also comprises an equalizer. The left and right channel signal components are subtracted in circuit 316 prior to filtering.

The surround sound effects are obtained by way of the channel comprising circuit 316 and band-pass filter 312. The band-pass filter circuit 312 also comprises an equalizer, and the filter permits desired signal frequencies to be passed to the amplifier 324, after an optional time delay 318.

Figure 4:
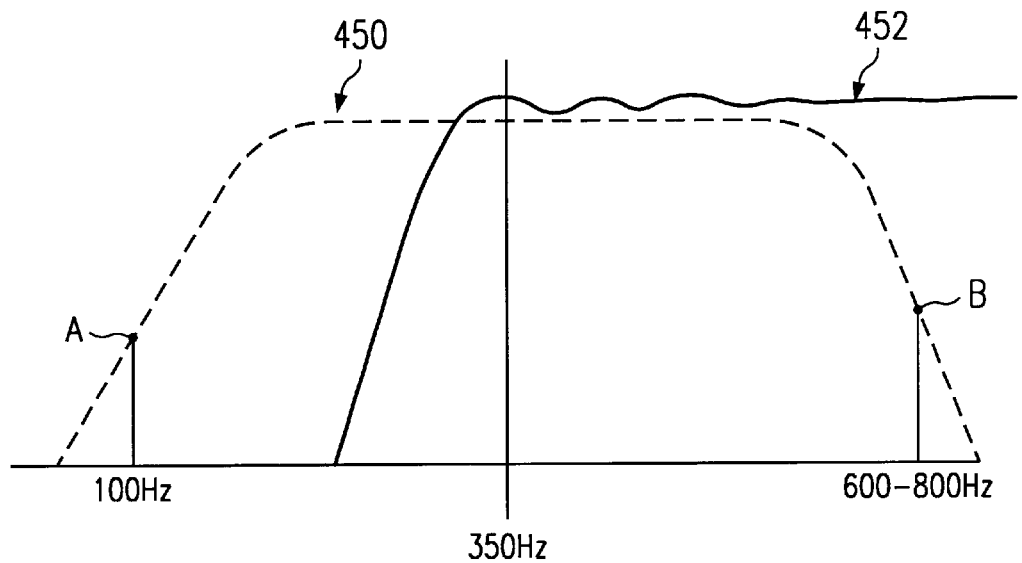
FIG. 4 shows a plot of the expansion speaker frequency response.

As shown in the frequency response diagram of FIG. 4, the expansion speaker has bandpass filtering which extends the upper roll-off point beyond that which is typical for conventional subwoofer systems. In this example, the expansion speaker's response curve 450 is based on a three-stage filter, and has a lower −3 dB point (Point A) of around 100 Hz, and an upper −3 dB point (Point B) of around 600 to 800 Hz. (By contrast, an upper −3 dB point for a small subwoofer would more typically be in the neighborhood of 300 to 400 Hz.) The frequency response curve 452 is developed using a 5-stage equalizer which extends the upper frequency range. The use of higher frequencies in the expansion speaker, which is mounted in the back of the chassis, gives more front-back depth to the acoustic image. Moreover, some of the added frequencies (those in the range below about 500 Hz but also above the usual subwoofer range) improve spatial impression.

Portable Computer/Expansion Base Block Diagram

Figure 5:
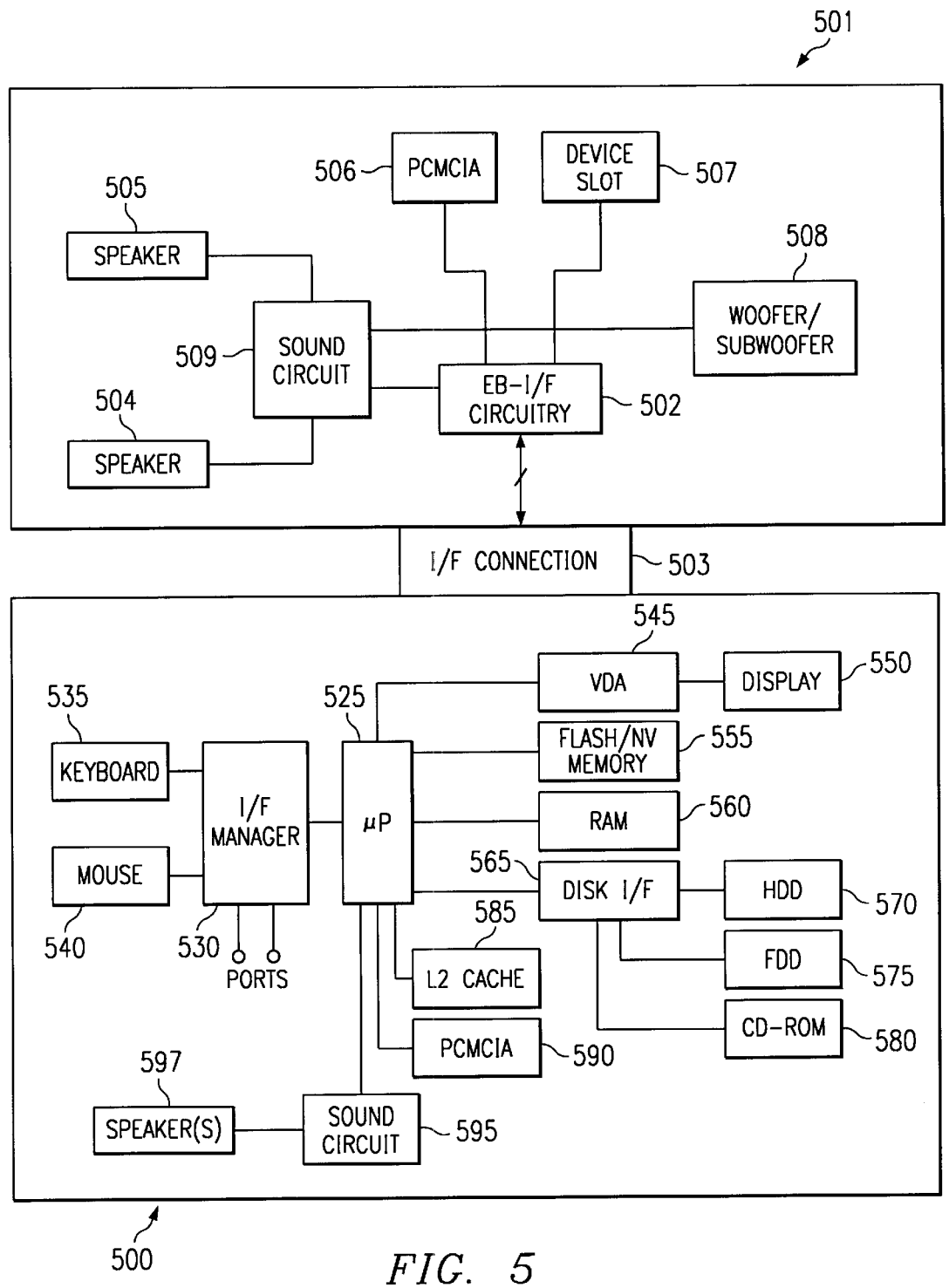
FIG. 5 shows a block diagram of a portable computer system when docked in the expansion base, and according to the preferred embodiment.

FIG. 5 shows a block diagram of a portable computer when docked in an expansion base, and according to the presently preferred embodiment. The expansion base 501 comprises an interface connection 503 for connecting to the portable computer 500. In this scenario, the expansion base 501 comprises a expansion speaker system 508 for generating the low bass sounds. Optionally, additional speakers 504 and 505 may be added into the base 501 for the high frequency stereo component. A sound circuit 509 provides interfacing to the speakers which are in the base 501. Other optional features of the base 501 are a PCMCIA card slot 506 for using cardbus devices, and a device slot 507 for inserting CD drives, or perhaps hard drives. The interface circuitry 502 provides general interfacing to many of the functions provide in the base 501.

The portable computer system 500 comprises, in this example:
  user input devices (e.g. keyboard 535 and mouse 540);
  at least one microprocessor 525 which is operatively connected to receive inputs from said input device, through an interface manager chip 530 (which also provides an interface to the various ports);
  a memory (e.g. flash or non-volatile memory 555 and RAM 560), which is accessible by the microprocessor;
  a data output device (e.g. display 550 and video display adapter card 545) which is connected to output data generated by the microprocessor 525;
  a magnetic disk drive 570 which is read-write accessible, through an interface unit 565, by the microprocessor 525: and
  a sound system comprising a sound circuit 595 driving a speaker system 597.

Optionally, of course, many other components can be included, and this configuration is not definitive by any means. For example, the portable computer may also include a CD-ROM drive 580 and floppy disk drive ("FDD") 575 which may interface to the disk interface controller 565. Additionally, L2 cache 585 may be added to speed data access from the disk drives to the microprocessor, and a PCMCIA 590 slot accommodates peripheral enhancements.

Alternative Embodiment: Extending Upper Frequency Range

According to one disclosed class of innovative embodiments, the upper range of the low-pass filter is not limited to 800 Hz, but may be extended through the voice band (e.g. to 10 kHz) to enhance the mid-range projection of the system.

According to a disclosed class of innovative embodiments, there is provided: A portable computer expansion base system, comprising: an interface for interfacing to a portable computer which includes a plurality of computer speakers; and at least one expansion base speaker mounted in said expansion base, and connected to be driven, together with said computer speakers of said portable computer docked in said expansion base, by an audio signal; wherein said expansion base speaker is predominantly rearward-firing, and operates at frequencies below 200 Hz and above 500 Hz; whereby acoustical energy emitted from said expansion base speaker can be reflected from ambient structures to a listener, and, in combination with sound emitted from said computer speakers, provides an enhanced psychoacoustic effect for the listener.

According to another disclosed class of innovative embodiments, there is provided: A portable computer expansion base system, comprising: an interface for interfacing to a portable computer which includes a plurality of computer speakers; device slots for accepting compatible devices into said expansion base; and at least one expansion base speaker mounted in said expansion base to emit acoustic energy in a predominantly rearward and/or sideways direction; wherein said expansion base speaker is driven to more than 700 Hertz at the upper −3 dB point, and to less than 200 Hz at a lower −3 dB point.

According to another disclosed class of innovative embodiments, there is provided: A portable computer expansion base system, comprising: a portable computer which includes a plurality of computer speakers and at least one audio signal generation circuit which is operatively connected to drive said computer speakers with a multi-channel audio signal; an expansion base, including an interface for interfacing to said portable computer; at least one enhancement speaker mounted in said expansion base, and mechanically positioned to be predominantly rearward-firing; and a driver circuit which is operatively connected to drive said enhancement speaker in accordance with said audio signal, over a frequency range which extends from frequencies below 200 Hz to frequencies above 500 Hz.

According to another disclosed class of innovative embodiments, there is provided: A method for providing low-frequency audio in a portable computer expansion base, comprising the steps of: operating one or more low-frequency-capable speakers, which are located in the back of said expansion base, in concert with computer speakers of a portable computer docked in said expansion base; wherein said computer speakers of said portable computer docked in said expansion base also emit voiceband audio signals in concert with low-frequency audio signals of said low-frequency speaker to produce an enhanced psychoacoustic effect; wherein sound generated from said low-frequency speaker is reflected back to a listener seated in front of said expansion base.

According to another disclosed class of innovative embodiments, there is provided: A method for providing low-frequency audio in a portable computer expansion base, comprising the steps of: (a.) interfacing to a portable computer with a plurality of computer speakers; (b.) transmitting an audio signal from said portable computer to at least one expansion base speaker mounted in said expansion base; wherein said audio signal comprises at least first and second component signals; and (c.) driving said expansion base speaker with a driver circuit, said driver circuit comprising both a low-pass filter for filtering said first signal component, and a band-pass filter for filtering said second signal component; a driver circuit which is operatively connected to drive said expansion base speaker in accordance with said audio signal, over a frequency range which extends from frequencies below 200 Hz to frequencies above 500 Hz; whereby said expansion base speaker enhances psychoacoustic effects.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

It should also be noted that the disclosed innovative ideas are not limited to systems which have only two channels of audio.

It should also be noted that the disclosed innovative ideas are not limited only to systems using ISA, EISA, and/or PCI busses, but can also be implemented in systems using other bus architectures.

It should also be noted that the disclosed innovative ideas are not limited only to systems based on an x86-compatible microprocessor, but can also be implemented in systems using 680x0, RISC, or other processor architectures.

It should also be noted that the disclosed innovative ideas are not by any means limited to systems using a single-processor CPU, but can also be implemented in computers using multiprocessor architectures.

What is claimed is:

1. A portable computer expansion base system, comprising:

an interface for interfacing to a portable computer which includes a plurality of computer speakers; and at least one expansion base speaker mounted in said expansion base, and connected to be driven, together with said computer speakers of said portable computer docked in said expansion base, by an audio signal; wherein sound from said expansion base speaker projects predominantly in a direction opposite from where a user would be located when typing on said portable computer, and said expansion base speaker operates at frequencies below 200 Hz and above 500 Hz;

whereby acoustical energy emitted from said expansion base speaker is reflected from ambient structures to a listener, and, in combination with sound emitted from said computer speakers, provides an enhanced psychoacoustic effect for the listener.

2. The system of claim 1, wherein said expansion base speaker is driven by a circuit comprising a low-pass filter whose upper frequency cut off is at least 2000 Hz.

3. The system of claim 1, wherein said expansion base speaker is mounted in the back of said expansion base.

4. The system of claim 1, wherein said expansion base speaker is operated only when said portable computer is docked in said expansion base.

5. The system of claim 1, wherein said expansion base speaker is operated with a lower −3 dB point of less than approximately 150 Hz, and an upper −3 dB point which is greater than approximately 600 Hz.

6. The system of claim 1, wherein said expansion base speaker receives audio signals which are filtered by a circuit comprising a low-pass filter with an upper roll-off at approximately 800 Hz, and a bandpass filter which passes frequencies in the range of approximately 200–600 Hz.

7. The system of claim 1, wherein said expansion base speaker receives at least two audio signals which are filtered by a circuit comprising a low-pass filter that receives the sum of said audio signals, and a bandpass filter which receives the difference of said audio signals.

8. A portable computer expansion base system, comprising:
   an interface for interfacing to a portable computer which includes a plurality of computer speakers;
   device slots for accepting compatible devices into said expansion base; and
   at least one expansion base speaker mounted in said expansion base to emit acoustic energy in a direction away from where a user would be located when typing on said portable computer;
   wherein said expansion base speaker is driven to more than 700 Hertz at the upper −3 dB point, and to less than 200 Hz at a lower −3 dB point.

9. The system of claim 8, wherein said expansion base speaker is operated only when said portable computer is docked in said expansion base.

10. The system of claim 8, wherein said expansion base speaker is driven by a circuit comprising a low-pass filter whose upper range may extended to approximately 10K Hz to enhance the mid-range.

11. The system of claim 8, wherein said expansion base speaker is operated with a lower −3 dB point of approximately 100 Hz, and an upper −3 dB point in the frequency range of 600–800 Hz.

12. The system of claim 8, wherein said expansion base speaker receives audio signals which are filtered by a circuit comprising a low-pass filter with an upper roll-off at approximately 800 Hz, and a bandpass filter which passes frequencies in the range of approximately 200–600 Hz.

13. The system of claim 8, wherein said expansion base speaker receives audio signals which are filtered by a circuit comprising a low-pass filter that receives the sum of said audio signals, and a bandpass filter which receives the difference of said audio signals.

14. A portable computer expansion base system, comprising:
   a portable computer which includes a plurality of computer speakers and at least one audio signal generation circuit which is operatively connected to drive said computer speakers with a multi-channel audio signal;
   an expansion base, including an interface for interfacing to said portable computer;
   at least one enhancement speaker mounted in said expansion base, and mechanically positioned to emit acoustical energy predominantly in a direction away from where a user would be located when using said portable computer; and
   a driver circuit which is operatively connected to drive said enhancement speaker in accordance with said audio signal, over a frequency range which extends from frequencies below 200 Hz to frequencies above 500 Hz.

15. The system of claim 14, wherein said enhancement speaker is operated only when said portable computer is docked in said expansion base.

16. The system of claim 14, wherein said driver circuit is operatively connected to drive said enhancement speaker in accordance with said audio signal, using both a low-pass filter function for filtering a first combination of components of said audio signal, and a band-pass filter function for filtering a different combination of said component signals.

17. The system of claim 14, wherein said driver circuit is physically located in said computer.

18. The system of claim 14, wherein said expansion base further comprises device slots for accepting compatible devices into said expansion base.

19. The system of claim 14, wherein said enhancement speaker is driven by a circuit comprising a low-pass filter whose upper range may extended to approximately 10K Hz to enhance the mid-range.

20. The system of claim 14, wherein said enhancement speaker is operated with a lower −3 dB point of approximately 100 Hz, and an upper −3 dB point in the frequency range of 600–800 Hz.

21. The system of claim 14, wherein said enhancement speaker receives audio signals which are filtered by a circuit comprising a low-pass filter that receives the sum of said audio signals, and a bandpass filter which receives the difference of said audio signals.

22. A method for providing low-frequency audio in a portable computer expansion base, comprising:
   operating one or more low-frequency-capable speakers, which are located in the back of said expansion base and project in a direction opposite from where a user would be located when typing on a portable computer docked in said expansion base, in concert with computer speakers of said portable computer;
   wherein said computer speakers of said portable computer docked in said expansion base also emit voiceband audio signals in concert with low-frequency audio signals of said one or more low-frequency-capable speakers to produce an enhanced psychoacoustic effect;
   wherein sound generated from said one or more low-frequency-capable speakers is reflected back to said user.

23. The method of claim 22, wherein said low-frequency-capable speakers is driven by a circuit comprising a low-pass filter whose upper range includes approximately 10K Hz to enhance the mid-range.

24. The method of claim 22, wherein said low-frequency-capable speakers is operated only when said portable computer is docked in said expansion base.

25. The method of claim 22, wherein said low-frequency-capable speakers is operated with a lower −3 dB point of approximately 100 Hz, and an upper −3 dB point in the frequency range of 600–800 Hz.

26. The method of claim 22, wherein said low-frequency-capable speakers receives audio signals which are filtered by a circuit comprising a low-pass filter with an upper roll-off at approximately 800 Hz, and a bandpass filter which passes frequencies in the range of approximately 200–600 Hz.

27. The method of claim 22, wherein said low-frequency-capable speakers receives audio signals which are filtered by a circuit comprising a low-pass filter, with an upper roll-off above 600 Hz, which receives the sum of said audio signals, and a bandpass filter which receives the difference of said audio signals.

28. A computer system, comprising:
   a portable computer adapted to be mated with an expansion base, said expansion base having a rear surface opposite the position in which a user sits while typing on a keyboard on said portable computer;
   said expansion base includes a speaker that is mounted in the rear surface to project sound in a direction away from a user typing on the portable computer, said speaker having a frequency response permitting the speaker to operate as both a sub-woofer and a directional speaker.

* * * * *